United States Patent [19]
Belart et al.

[11] 3,815,364
[45] June 11, 1974

[54] MASTER CYLINDER FOR A TWO-CIRCUIT BRAKE SYSTEM
[75] Inventors: Juan Belart; Werner Volkmar, both of Walsdorf, Germany
[73] Assignee: ITT Industries, New York, N.Y.
[22] Filed: Nov. 20, 1972
[21] Appl. No.: 307,909

[30] Foreign Application Priority Data
Dec. 24, 1971 Germany.......................... 2164592

[52] U.S. Cl......................... 60/552, 91/376, 91/372
[51] Int. Cl................................ F15b 7/08, F15b 9/10
[58] Field of Search ............ 91/376, 378, 372, 391; 60/547, 549, 552, 553, 560, 565, 566

[56] References Cited
UNITED STATES PATENTS
| | | | |
|---|---|---|---|
| 2,239,751 | 4/1941 | Kritzer | 60/562 |
| 2,410,269 | 10/1946 | Chomings | 60/553 |
| 2,775,957 | 1/1957 | Anderson | 91/378 |
| 2,916,882 | 12/1959 | Spalding et al. | 91/378 |
| 3,638,528 | 2/1972 | Lewis | 91/6 |

FOREIGN PATENTS OR APPLICATIONS
1,917,954 10/1970 Germany .......................... 91/378

Primary Examiner—Edgar W. Geoghegan
Assistant Examiner—A. M. Zupcic
Attorney, Agent, or Firm—John T. O'Halloran; Menotti J. Lombardi, Jr.; Alfred C. Hill

[57] ABSTRACT

This relates to a master cylinder for a two-circuit brake system having a hydropneumatic accumulator connected thereto. The master cylinder includes a master piston having coaxially disposed therein an axially displaceable control piston. A spring controls the relative motion of the master piston and control piston. The control piston includes a longitudinal bore and a transverse bore in communication. The transverse bore will line up with the accumulator valve and apply pressure from the accumulator through the longitudinal bore to the working surface of the master piston. Upon actuation of the brake pedal, at first a certain pressure is applied to at least one of the two brake circuits by the master piston. Further advance of the brake pedal causes relative displacement between the two pistons until the transverse bore is aligned with the valve which is opened by an inclined surface contained in the outer surface of the master piston. Immediately the pressure delivered by the accumulator through the open valve is applied to the working surface of the master piston so that the brake force to both brake circuits is now provided by the accumulator.

20 Claims, 3 Drawing Figures

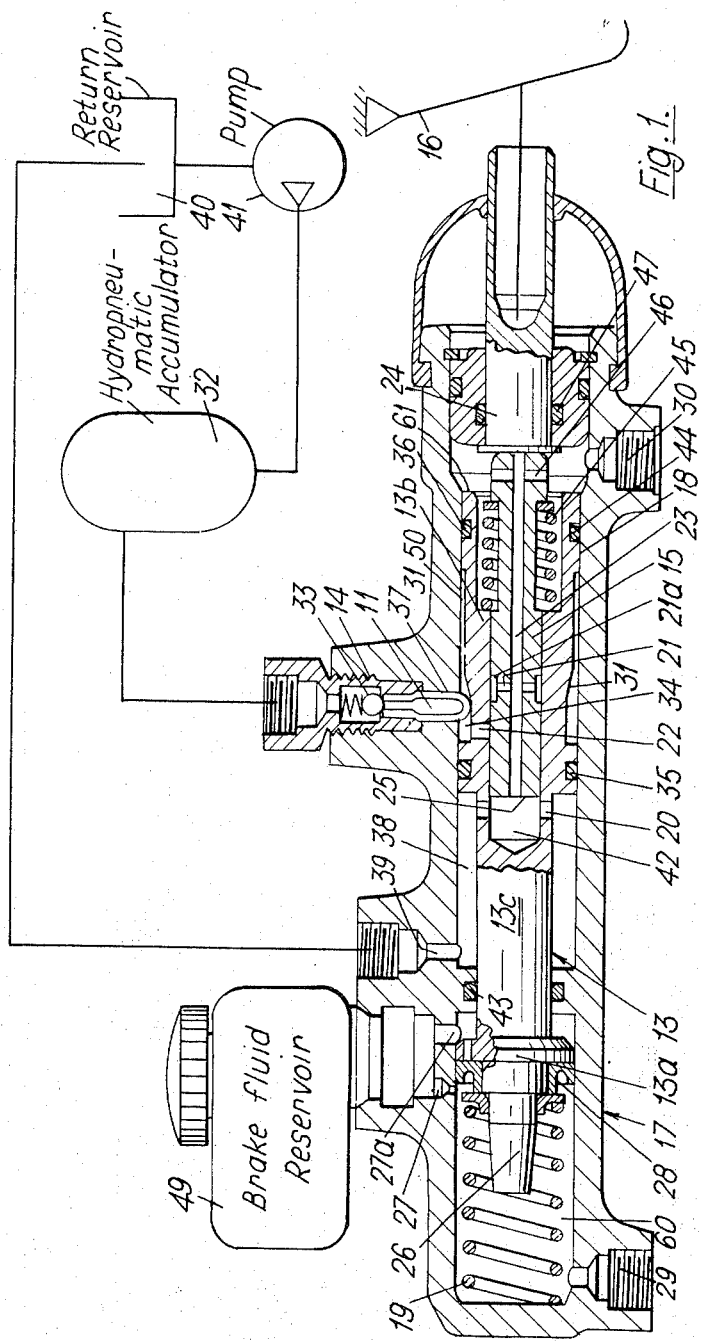

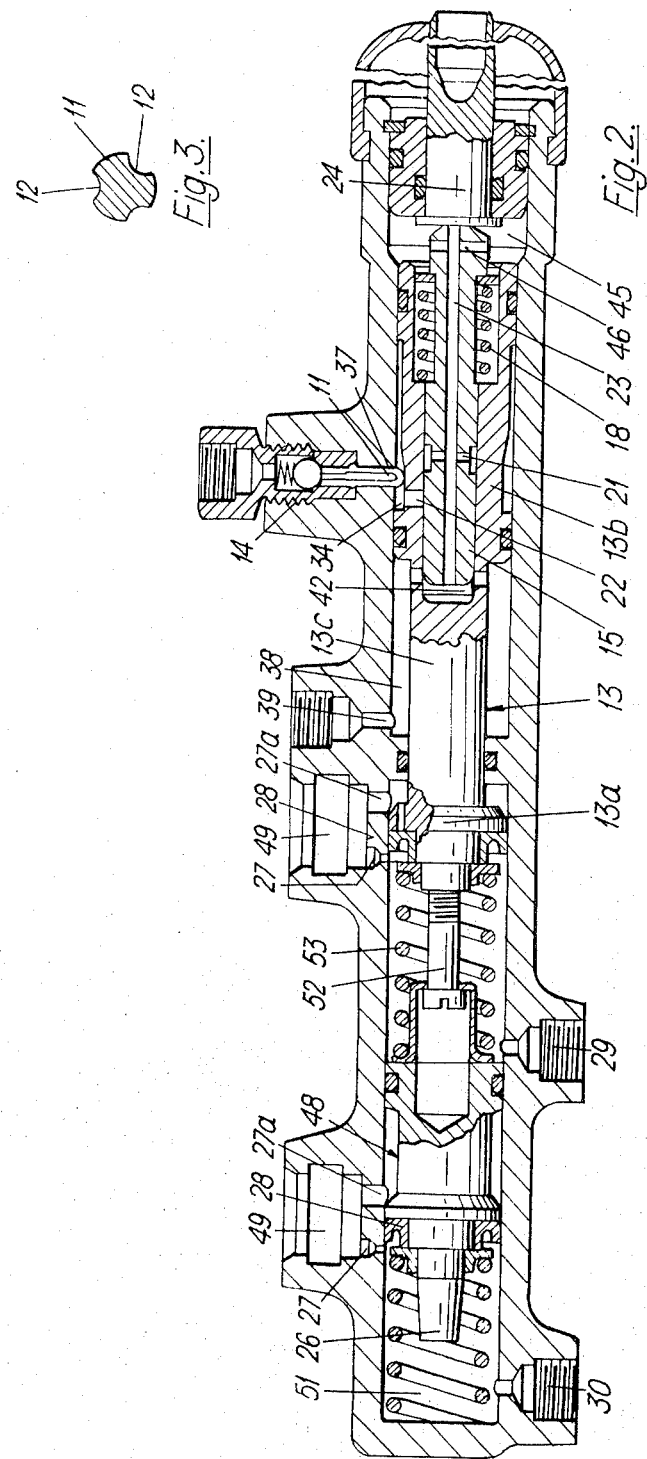

MASTER CYLINDER FOR A TWO-CIRCUIT BRAKE SYSTEM

BACKGROUND OF THE INVENTION

The invention relates to a master cylinder for a two-circuit brake system, particularly for motor vehicles, provided with at least one master piston hydraulically applying pressure to one brake circuit and on its part mechanically actuated by the brake pedal and opening a valve upon its advance to have the pressure of a pressure source applied through the open valve to the brake-pedal-actuated end of the master piston.

The object of such a master cylinder is to use the brake pedal mainly as a control element only and to generate the actual braking pressure by means of the pressure source usually provided by an accumulator, but which, upon a failure of the pressure source, enables the force mechanically applied to the brake pedal to generate a braking pressure sufficient for at least an emergency braking.

SUMMARY OF THE INVENTION

The object of the invention is to provide a master cylinder of the type mentioned above which is a compact and relatively simple structure, which is cheaper to manufacture, which has an improved operational safety, and which enables easy servicing.

A feature of the present invention is the provision of a master cylinder for a two-circuit brake system comprising: a source of pressurized brake pressure medium; a cylindrical housing having a longitudinal axis; a master piston disposed coaxially of the axis within the housing, the master piston having a first longitudinal bore in a portion thereof adjacent one end of the master piston; a control piston disposed in the first longitudinal bore coaxial of the axis and longitudinally displaceable in the first longitudinal bore; a valve having a tappet extending through a first bore in the wall of the housing transverse to the axis, the end of the tappet engaging a cam area disposed on the outer surface of the master piston to open the valve upon advance of the master cylinder; a first spring disposed to interact with the master piston and the control piston to control the relative motion of the master piston and the control piston; a brake pedal; a push rod connecting the brake pedal to one end of the control piston adjacent the one end of the master piston; a first chamber defined by the one end of the master piston, the adjacent end of the push rod and the inner surface of the housing; a first brake circuit extending through a second bore in the wall of the housing actuated by the opposite end of the master piston upon advance of the master cylinder; the one end of the master cylinder providing a working surface for the master cylinder in the first chamber; and the control piston including a second longitudinal bore therethrough in communication with the first chamber; and a first transverse bore spaced from the first chamber in communication with the second longitudinal bore and in communication with a third bore through the wall of the master piston upon an advance of the master piston a predetermined distance, the third bore being in communication with the source when the valve is open; the brake pedal actuating the control piston to advance the master piston by means of the first spring to actuate the first brake circuit and open the valve, the control piston advancing relative to the master piston to align the first transverse bore with the third bore and apply pressure from the source to the working surface through the second longitudinal bore.

In order to solve this task the present invention provides the transmission of the brake-pedal force to the master piston via a control piston longitudinally displaceable within the master piston and via a spring disposed between the master piston and the control piston. Further this invention provides in the control piston a longitudinal bore and a transverse bore which is communicating with the longitudinal bore and which is adaptable to a bore of the master piston which leads to the valve. In this way, upon actuation of the brake pedal, at first a certain pressure is generated in the brake circuit actuated by the master piston. Upon a further advance of the brake pedal there ensues a relative displacement between the master piston and the control piston which will last until the transverse bore and the bore leading to the valve are in alignment. At this instant the pressure delivered via the intermediately opened valve is applied to the front end or working surface of the master piston so that the main part of the braking force is now generated by the pressure source. The brake pedal is acted upon only by an exactly dosable reaction force which corresponds to the cross-section of the control piston.

According to one embodiment of the present invention the master piston includes a conventional-design piston section which applies the first brake circuit and a control section containing the control piston axially disposed behind the above-mentioned piston section.

The control section as well as the piston section are generally cylindrical and the control section is concentric with respect to the control piston.

An especially operationally safe and easily realizable actuation of the valve is ensured in that the control section has an annular cam area of inclined ascent on which the tappet of the valve rests. The pressure source is preferably a hydropneumatic accumulator.

According to the present invention the valve is a ball valve which in the closing direction is actuated by the force of a spring acting in the direction of the accumulator pressure and which in the opening direction is acted upon by the tappet. In this way, in its closing direction the valve is actuated by the pressure spring as well as by the accumulator pressure. The valve can be opened only by actuation of the tappet via the cam area of the control section of the master piston.

At the cam area an annular chamber is expediently provided which is sealed off by seals adjacent the ends of the control section, which is connected to the valve via an aperture in the housing wall, and in which the bore in the control section ends which leads to the control piston. Thus, the annular chamber serves as connection element between the valve connected to the accumulator and the transverse and longitudinal bores provided in the control piston.

Further according to the present invention the master piston includes a cylindrical connection piece of reduced diameter between the control section and the piston section around which there is an annular chamber which is connected via a bore in the housing wall to the return tank or return reservoir of the accumulator-actuating pump. In this design the bore in the housing wall is connected with the annular chamber and the annular chamber is connected to the longitudinal bore of the control piston via a connection bore in the connection piece. The connection bore in the control piston is preferably arranged such that it is slid over and blocked by the control piston before opening of the valve and to communicate with the longitudinal bore when it is in the rest position. Further, the annular chamber is expediently sealed off from the piston section by a further annular seal. Due to this design the bores in the control piston are alternately connected to the pressure source or to the return tank.

The transverse bore preferably ends in an annular groove on the outer surface of the control piston in order to ensure a safe connection to the bore through the control section of the master piston even upon a twisting of the control piston.

In the rest position the axial spacing of the transverse bore of the control piston and the wall bore of the control section surpasses the axial spacing of the bottom of the control piston and the connection bore of the connection piece. Thus, it is ensured that prior to a connection of the pressure source to the annular chamber in the cam area the bores within the control piston are disconnected from the return tank.

Between one portion of the outer surface of the control piston and one portion of the inner surface of the control section there is provided an annular cavity to receive the pressure spring controlling the relative motion of the two pistons. Thus, this spring is housed in a simple manner without any additional space being needed.

According to the present invention the return spring of the master piston is weaker than the pressure spring disposed between the master piston and the control piston. In this way it is ensured that a relative displacement between the control piston and the master piston will not ensue before a certain pressure has been built up in the brake circuit actuated by the master piston.

In one embodiment according to the present invention the second brake circuit is connected to the longitudinal bore provided in the control piston. In this way the action of the master cylinder may be extended in a simple manner to a second brake circuit, said master cylinder in itself also being advantageously applicable in a single-circuit brake system. To this end, the control piston advantageously protrudes from the control section and extends into a blocked-off chamber. In order to easily apply pressure to this chamber the protruding portion of the control piston is expediently provided with another transverse bore in communication with the longitudinal bore.

The push rod actuated by the brake pedal preferably extends in an all round sealed-off manner through a seal into the blocked-off chamber and abuts the front end of the control piston when it is in the rest position. The cross-section of the push-rod is such as to ensure the retransmission of a reaction force adapted to the human pedal force to the brake pedal, said reaction force further being proportional to the brake pressure acting upon the master piston. The cross-sectional surface of the actuating push-rod, thus, is suitably reduced in proportion to the cross-sectional surface of the master piston.

The valve tappet is advantageously cylindrical in shape and has grooves extending lengthwise thereof. The valve tappet is slidably arranged in a correspondingly designed cylindrical bore in the housing wall, the grooves in the surface of the valve tappet ensure the passage of the pressure medium.

In another embodiment of the present invention the blocked-off chamber into which the brake pedal push rod extends has no connection to the outside. However, if the master cylinder is to be designed to be a two-circuit master cylinder the invention provides that the pressure is applied application of the second brake circuit in the conventional manner via an additional piston connected to the end of the piston section of the master piston remote from the control section of the master piston.

BRIEF DESCRIPTION OF THE DRAWING

Above-mentioned and other features and objects of this invention will become more apparent by reference to the following description taken in conjunction with the accompanying drawing, in which:

FIG. 1 illustrates a longitudinal cross section of one embodiment of the master cylinder in accordance with the principles of the present invention and a schematic illustration of the accumulator, the pump and pressure medium tanks cooperating therewith;

FIG. 2 illustrates a longitudinal cross section of another embodiment of the master cylinder in accordance with the principles of the present invention; and FIG. 3 illustrates a transverse cross-section of the valve tappet of FIGS. 1 and 2.

DESCRIPTION OF THE PREFERRED EMBODIMENTS

According to FIG. 1 in a master cylinder cylindrical housing 17 having a longitudinal axis a master piston 13 is disposed coaxially of the longitudinal axis within housing 17. Master piston 13 consists of a conventional-design piston section 13a provided with a primary collar 28, of a connection piece 13c of reduced diameter, and of a control section 13b disposed behind piece 13c. The piston section 13a cooperates in the usual manner with a compensation bore 27 as well as with a fluid-supply bore 27a which are connected to a tank or reservoir 49 containing the brake pressure medium or fluid.

Piston section 13a is further provided with an abutment 26 which in the event of failure of the brake circuit 29 comes into contact with the bottom of housing 17 and, thus, prevents any further displacement of piston 13 in this situation.

A return spring 19 ensures that master piston 13 is always returning into its initial position.

According to this invention control section 13b of the master piston 13 has a cam area 31 which is annularly extending along the outside surface of control section 13b and forms a ramp which in the drawing is descending from the right to the left. This ramp cooperates with the tappet 11 of a ball valve 14 disposed in the wall of housing 17. Ball valve 14 is prestressed in its closing direction by means of a pressure spring 33. Cam area 31 is designed such that in the rest position illustrated in the drawing spring 33 pushes tappet 11 into cam area 31 far enough to close ball valve 14. When control section 13b moves to the left (FIG. 1) tappet 11 is lifted by cam area 31 and opens ball valve 14.

Valve 14 is connected to a hydropneumatic accumulator 32 which is supplied with pressure by a pump 41. The return tank or return reservoir 40 of pump 41 is connected with a further wall bore 39 of housing 17 via a pressure medium line.

According to the present invention control section 13b of master piston 13 is provided with a bore 42 which is cylindrical and coaxially disposed with respect to the longitudinal axis. A control piston 15 is disposed in an axially displaceable manner in bore 42. Between one portion of control piston 15 and control section 13b a cavity 44 is provided which houses a spring 18. Spring 18 tries to displace control piston 15 out of bore 42. According to this invention spring 18 is rated stronger than return spring 19 of the master piston.

According to the present invention an easily manufacturable longitudinal bore 23 extends throughout the entire length of control piston 15. Further there is a transverse bore 21 which ends in an annular groove 21a and is disposed so as to communicate with longitudinal bore 23. Transverse bore 21 is also spaced axially a distance from the wall bore 22 through control section 13b to ensure that transverse bore 21 will not become aligned with wall bore 22 before there has been a certain relative displacement between control piston 15 and control section 13b.

Further, according to the invention, in connection piece 13c a connection bore 20 is provided which communicates with bore 42, on the one hand, and an annular chamber 38, on the other hand. The axial distance of bore 20 to the bottom 25 of control piston 15 is such that control piston 15 blocks bore 20 before transverse bore 21 and bore 22 will become aligned.

The annular chamber 38 communicates with return tank 40 of pump 41 via the wall bore 39 in housing 17.

The front side of control piston 15 is abutted by the push rod 24 which is mechanically actuated by the brake pedal 16. Push rod 24 is sealed to the inner surface of housing 17 by a seal 47 and is passed through the front wall of housing 17.

According to the invention control piston 15 extends into a chamber 45 provided at the front end of master cylinder housing 17 adjacent push rod 24. In order to pass the pressure inside longitudinal bore 23 into chamber 45 a second transverse bore 46 is provided in the protruding portion of control piston 15.

The annular chamber 34 provided in cam area 31 is sealed off against the outside by means of seals 35 and 36 so that the pressure prevailing in annular chamber 34 can pass only via wall bore 22 of control section 13b.

Further connection piece 13c is sealed off from piston section 13a by means of a further annular seal 43.

Valve 14 and valve tappet 11 are housed in a corresponding opening 37 of master cylinder housing 17.

In the embodiment of FIG. 1, the first brake circuit 29 is connected to the chamber 60 actuated by piston section 13a, while the second brake circuit 30 is connected to chamber 45.

The master cylinder of FIG. 1 operates as follows:

Upon the actuation of brake pedal 16 at first master piston 13 is moved to the left until in brake circuit 29 a certain pressure has built up. Now control piston 15 within control section 13b is displaced until the bores 21 and 22 become aligned, spring 18 being compressed. Before bores 21 and 22 become aligned bore 20 leading to return tank 40 has been clocked by the advanced control piston 15.

As soon as bores 21 and 22 have become aligned the pressure already passed through opened valve 14 may pass into chamber 45 via longitudinal bore 23. From chamber 45 the pressure, on the one hand, is applied to the transverse working surface 61 of master piston 13 and, on the other hand, is passed into second brake circuit 30.

A further function of the pressure prevailing in chamber 45 is to exert the required reaction force on brake pedal 16 via push rod 24.

When braking is terminated control piston 15 moves to the right (FIG. 1), due to the action of spring 18, whereupon at first bores 21 and 22 will fall out of alignment and, hence, the pressure source is cut off from chamber 45. In the further course of the movement of control piston 15 bore 20 is unblocked and the pressure prevailing in chamber 45 will be discharged to return tank 40 via longitudinal bore 23, bore 20, annular chamber 38, and wall bore 39. Now, due to the action of return spring 19, piston 13 returns into its initial position and valve 14 is closed.

It is obvious that the master cylinder illustrated in FIG. 1 will also safely operate if there is no brake circuit connected at 30 and only one sole brake circuit is connected at 29.

In the embodiment of FIG. 1 brake circuit 29 is preferably connected to the front axle while brake circuit 30 is preferably connected to the rear axle. This arrangement is preferred since in the event of a failure of the second brake circuit it will be still possible to mechanically apply pressure to first brake circuit 29 by means of brake pedal 16. In doing so, spring 18 is compressed until the bottom 25 of control piston 15 comes to rest against the bottom of cylindrical bore 42. Even upon failure of pressure source 32 this mode of operation will ensure the braking of the front wheels.

However, if there is a failure in first brake circuit 29, due to the relatively long slot 50 master piston 13 will be able to move until abutment 26 comes into contact with the bottom of master cylinder housing 17 due to the relatively long slot 50 in the outer surface of control piston 15. Then brake circuit 30 is actuated by the pressure of accumulator 32 in the manner described above. Only in the highly unlikely event of a simultaneous failure of pressure source 32 and first brake circuit 29 no braking effect will be achieved at all.

However, if it is intended to make provisions for this unlikely event, also, the embodiment of FIG. 2 may be employed. The embodiment of FIG. 2 differs from the embodiment of FIG. 1 mainly by the fact that the second brake circuit is not directly connected to chamber 45 but rather is connected to a cylindrical chamber 51 applied with pressure by an intermediary or additional piston 48. Master piston 13 and intermediary piston 48 are interconnected by means of a connection member 52 so as to be always kept apart at a certain distance by means of a spring 53, yet to be able to come into abutment in a mechanical manner upon the failure of brake circuit 29 so that the mechanical or hydraulic force exerted on master piston 13 will be transmitted to second brake circuit 30. Upon a simultaneous failure of one brake circuit and of the pressure source the embodiment of FIG. 2 allows the remaining brake circuit to be actuated by the mechanical brake-pedal force.

FIG. 3 illustrates the cross-section of the inventive valve tappet 11 which essentially is circular, but yet is provided with grooves 12 which serve for the passage of the pressure medium between tappet 11 and bore 37.

We claim:

1. A master cylinder for a two-circuit brake system comprising:
   a source of pressurized brake pressure medium;
   a cylindrical housing having a longitudinal axis;
   a master piston disposed coaxially of said axis within said housing, said master piston having a first longitudinal bore in a portion thereof adjacent one end of said master piston;
   a control piston disposed in said first longitudinal bore coaxial of said axis and longitudinally displaceable in said first longitudinal bore;
   a valve having a tappet extending through a first bore in the wall of said housing transverse to said axis, the end of said tappet engaging a cam area disposed on the outer surface of said master piston to open said valve upon advance of said master piston during all braking operations;
   a first spring disposed to interact with said master piston and said control piston to control the relative motion of said master piston and said control piston;
   a brake pedal;
   a push rod connecting said brake pedal to one end of said control piston adjacent said one end of said master piston;
   a first chamber defined by said one end of said master piston, the adjacent end of said push rod and the inner surface of said housing;
   a first brake circuit extending through a second bore in the wall of said housing actuated by the opposite end of said master piston upon advance of said master piston;
   said one end of said master piston providing a working surface for said master piston in said first chamber;
   said control piston including
      a second longitudinal bore therethrough coaxial of said axis and in communication with said first chamber, and
      a first transverse bore spaced from said first chamber directly connected to said second longitudinal bore and in communication with a third bore through the wall of said master piston upon an advance of said control piston relative to said master piston to allign said first transverse bore with said third bore, said third bore being in communication with said source when said valve is open;
   said brake pedal actuating said control piston to advance said master piston by means of said first spring to actuate said first brake circuit and open said valve, said control piston advancing relative to said master piston to align said first transverse bore with said third bore and apply pressure from said source to said working surface through said second longitudinal bore;
   said master piston including
      a piston section adjacent said first brake circuit, and
      a control section disposed in tandem relation with said piston section between said piston section and said push rod; and
   an annular cavity formed in a portion of the inner circumferential wall of said control section and a corresponding portion of the outer circumferential wall of said control piston to receive said first spring.

2. A master cylinder according to claim 1, wherein said control section and said piston section are both cylindrical, and
   said control section contains and is concentric with said control piston.

3. A master cylinder according to claim 2, wherein said control section includes said cam area on the outer surface thereof and said working surface on one end thereof adjacent said push rod; and
   said cam area includes
      an inclined surface ascending toward said working surface.

4. A master cylinder according to claim 3, wherein said source includes
   a hydropneumatic accumulator.

5. A master cylinder according to claim 4, wherein said valve includes
   a ball valve having a second spring to close said ball valve when said tappet is at the bottom of said inclined surface, said ball valve being opened when said tappet moves a predetermined distance up said inclined surface.

6. A master cylinder according to claim 5, further including
   a first annular chamber between the outer surface of said control section and the inner surface of said housing embracing said cam area,
   said first annular chamber being sealed by a first seal between the outer surface of said control section and the inner surface of said housing adjacent said one end of said control section and a second seal between the outer surface of said control section and the inner surface of said housing adjacent the opposite end of said control section,
   said first annular chamber being in communication with said valve through said first bore and in communication with said first transverse bore upon advance of said control piston relative to said master piston, through said third bore.

7. A master cylinder according to claim 6, wherein said master piston further includes
   a cylindrical connection piece connecting said piston section and said control section; and
   said source includes
      a return tank,
      a brake pressure medium accumulator, and
      a pump disposed between said return tank and said accumulator; and
   further including
      a second annular chamber disposed between said outer surface of said connection piece and the inner surface of said housing, and
      a fourth bore extending through the wall of said housing in communication with said second annular chamber connected to said return tank.

8. A master cylinder according to claim 7, further including
   a fifth bore extending through the wall of said connecting piece in communication with said second longitudinal bore through said first longitudinal bore and with said second annular chamber.

9. A master cylinder according to claim 8, wherein said fifth bore is spaced from the end of said control piston opposite said push rod a predetermined amount to enable said control piston to block said fifth bore before said valve is opened.

10. A master cylinder according to claim 9, wherein said second annular chamber is sealed by said second seal and a third seal disposed between the inner surface of said housing and the outer surface of said connection piece adjacent said piston section.

11. A master cylinder according to claim 10, further including an annular groove in the outer surface of said control piston in communication with said first transverse bore.

12. A master cylinder according to claim 11, wherein in the rest position the axial spacing of said first transverse bore and said third bore is greater than the axial spacing of said fifth bore and the end of said control piston opposite said push rod.

13. A master cylinder according to claim 12, further including a third spring coupled between said master piston and a wall of said housing transverse to said axis to return said master piston to its rest position after a braking operation, said third spring being weaker than said first spring.

14. A master cylinder according to claim 13, wherein said control piston extends from said one end of said control section into said first chamber.

15. A master cylinder according to claim 14, further including a seal arrangement to provide a seal between the outer surface of said push rod and the inner surface of said housing, said push rod extending into said first chamber to rest against the end of that portion of said control piston extending into said first chamber in the rest position of said master cylinder.

16. A master cylinder according to claim 15, wherein said tappet is cylindrical in shape having grooves extending lengthwise thereof.

17. A master cylinder according to claim 16, wherein a second brake circuit is connected to said second longitudinal bore.

18. A master cylinder according to claim 17, further including a second transverse bore disposed in that portion of said control piston extending into said first chamber in communication with said second longitudinal bore and said first chamber.

19. A master cylinder according to claim 18, wherein said second brake circuit is connected to said first chamber.

20. A master cylinder according to claim 16, further including an additional piston disposed in said housing connected to said piston section remote from said push rod; and wherein a second brake circuit is connected to a sixth bore in the wall of said housing, said second brake circuit being actuated by said additional piston.

* * * * *